United States Patent
Huang et al.

(10) Patent No.: US 10,733,890 B2
(45) Date of Patent: Aug. 4, 2020

(54) METHOD FOR ESTABLISHING A PARKING SPACE DETECTION MODEL AND METHOD OF DETECTING PARKING SPACES FOR A PARKING LOT

(71) Applicant: NATIONAL CHUNG CHENG UNIVERSITY, Chiayi County (TW)

(72) Inventors: Ching-Chun Huang, Taichung (TW); Vu-Hoang Tran, Chiayi County (TW); Hung-Sheng Cheng, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 203 days.

(21) Appl. No.: 16/005,898

(22) Filed: Jun. 12, 2018

(65) Prior Publication Data
US 2019/0228658 A1   Jul. 25, 2019

(30) Foreign Application Priority Data

Jan. 24, 2018   (TW) .............................. 107102510 A

(51) Int. Cl.
*G08G 1/14*   (2006.01)
*G06T 7/00*   (2017.01)
*G06K 9/00*   (2006.01)

(52) U.S. Cl.
CPC ......... *G08G 1/143* (2013.01); *G06K 9/00812* (2013.01); *G06T 7/97* (2017.01); *G06T 2207/30264* (2013.01)

(58) Field of Classification Search
CPC ....... G08G 1/143; G06T 7/97; G06K 9/00812
See application file for complete search history.

(56) References Cited

U.S. PATENT DOCUMENTS

| | | | |
|---|---|---|---|
| 2005/0002544 A1* | 1/2005 | Winter | G08G 1/14 382/104 |
| 2009/0085772 A1* | 4/2009 | Huang | G08G 1/14 340/932.2 |
| 2015/0086071 A1* | 3/2015 | Wu | G06T 15/205 382/103 |
| 2018/0301031 A1* | 10/2018 | Naamani | G06K 9/00771 |
| 2019/0147368 A1* | 5/2019 | Pinel | G08G 1/0129 706/12 |

* cited by examiner

*Primary Examiner* — Leon Flores

(57) ABSTRACT

A method to be implemented by a computer system includes: transforming each of training images into a respective transformed training image; calculating a classification loss value based on detection results that are acquired from parking status prediction results obtained by performing feature extraction on the transformed training images; and adjusting candidate spatial transforming parameters, candidate feature extraction parameters and candidate logistic regression parameters when it is determined that a combination of the aforementioned parameters is not optimal based on the classification loss value, followed by repeating above-mentioned steps using the adjusted parameters.

12 Claims, 8 Drawing Sheets

METHOD FOR ESTABLISHING A PARKING SPACE DETECTION MODEL AND METHOD OF DETECTING PARKING SPACES FOR A PARKING LOT

CROSS-REFERENCE TO RELATED APPLICATION

This application claims priority of Taiwanese Invention Patent Application No. 107102510, filed on Jan. 24, 2018.

FIELD

The disclosure relates to a method of processing image data, and more particularly to a method for establishing a parking space detection model and a method of detecting parking spaces for a parking lot.

BACKGROUND

A conventional method of detecting parking spaces for a parking lot is implemented by performing classification, based on various image features, on images of parking spaces that are obtained by sensors observing the parking spaces so as to classify individual parking spaces into an occupied class or a vacant class. To alleviate inter-occlusion problem, shadow problem, lighting problem and perspective problem to which classification of parking spaces in an outdoor parking lot is vulnerable, camera geometry and projection matrix are utilized in the conventional method to select regions of the images of parking spaces appropriate for performance of the classification thereon.

However, it is challenging to utilize a single criteria to perform classification on images of parking spaces with different types of pavement (e.g., grassland, brick floor and asphalt surface). Moreover, non-uniform dimensions of the parking spaces further adversely affect the accuracy of classification of images of parking spaces.

SUMMARY

Therefore, an object of the disclosure is to provide a method for establishing a parking space detection model and a method of detecting parking spaces for a parking lot that can alleviate at least one of the drawbacks of the prior art.

According to one aspect of the disclosure, the method for establishing a parking space detection model includes:

step (A): providing a computer system that stores a plurality of training parking images, wherein each of the training parking images shows therein a set of training parking spaces which are connected together, and each of which has a parking status that is one of an occupied status and a vacant status, one of the training parking spaces being a target training parking space, the computer system further storing the parking status of the target training parking space in each of the training parking images;

step (B): transforming, by the computer system, each of the first training parking images into a corresponding first transformed training parking image based on a set of candidate spatial transforming parameters;

step (C): performing, by the computer system, feature extraction on each of the transformed training parking image, which respectively correspond to the training parking images, based on a set of candidate feature extraction parameters, so as to acquire a parking status prediction result relating to the training parking spaces shown in one of the training parking images that corresponds to the transformed training parking image;

step (D): acquiring, for each of the transformed training parking images and by the computer system, a detection result for the target training parking space based on a set of candidate logistic regression parameters and the parking status prediction result that corresponds to the transformed training parking image;

step (E): calculating, by the computer system, a status classification loss value based on the detection results that respectively correspond to the transformed training parking images and the parking statuses of the target training parking space in the training parking images;

step (F): determining, by the computer system and based on at least the status classification loss value, whether a combination of the candidate spatial transforming parameters, the candidate feature extraction parameters and the candidate logistic regression parameters is an optimal combination; and step (G): adjusting, by the computer system, the candidate spatial transforming parameters, the candidate feature extraction parameters and the candidate logistic regression parameters when it is determined in step (F) that the combination of the candidate spatial transforming parameters, the candidate feature extraction parameters and the candidate logistic regression parameters is not an optimal combination, followed by repeating steps (B) to (F) using the candidate spatial transforming parameters, the candidate feature extraction parameters and the candidate logistic regression parameters thus adjusted.

According to another aspect of the disclosure, the method of detecting parking spaces for a parking lot includes:

step (a): providing a computer system that stores a plurality of training parking images, wherein each of the training parking images shows therein a set of training parking spaces which are connected together, and each of which has a parking status that is one of an occupied status and a vacant status;

step (b): training, by the computer system, a parking space detection model based on the training parking images to acquire a set of spatial transforming parameters, a set of feature extraction parameters and a set of logistic regression parameters for the parking space detection model;

step (c): transforming, by the computer system, a target parking image, which shows a plurality of parking spaces including a target parking space, into a transformed target parking image based on the spatial transforming parameters;

step (d): performing, by the computer system, feature extraction on the transformed target parking image based on the feature extraction parameters to acquire a parking status prediction result relating to the parking spaces shown in the target parking image;

step (e): acquiring, by the computer system, a target parking space detection result for the target parking space based on the logistic regression parameters and the parking status prediction result; and step (f): notifying, by the computer system, a vehicle driver of the parking status of the target parking space based on the target parking space detection result.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
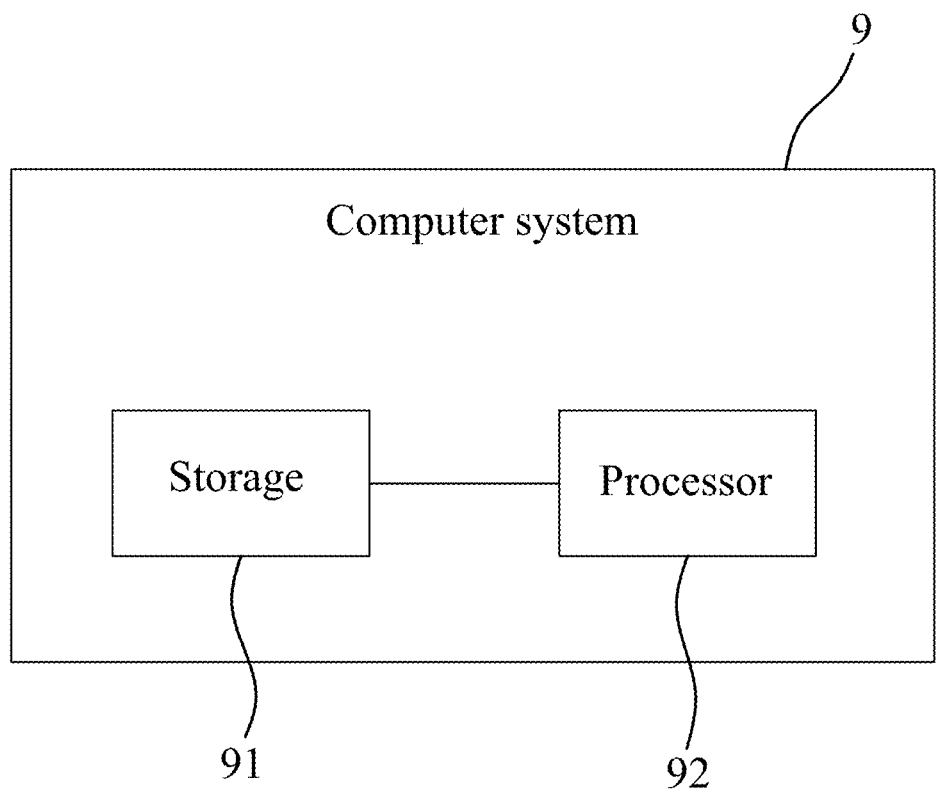
FIG. 1 is a block diagram illustrating an embodiment of a computer system utilized to implement a method for establishing a parking space detection model according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates an embodiment of a computer system 9 that is utilized to implement a method for establishing a parking space detection model and a method of detecting parking spaces for a parking lot according to the disclosure. The computer system 9 includes a storage 91 and a processor 92 electrically connected to the storage 91. The storage 91 may be implemented to be a Hard Disk Drive (HDD), a Solid-State Disk (SSD) or a flash memory. The processor 92 may be implemented to be a Central Processing Unit (CPU), a microprocessor or any circuit configurable/programmable in a software manner and/or hardware manner to implement functionalities of this disclosure. However, implementations of the storage 91 and the processor 92 are not limited to the disclosure herein.

The storage 91 of the computer system 9 stores N number of first training parking images and N number of second training parking images. Each of the first training parking images shows therein a set of first training parking spaces which includes M number of first training parking spaces which are connected together, and each of which has a parking status that is one of an occupied status and a vacant status. One of the first training parking spaces is a target first training parking space. Similarly, each of the second training parking images shows therein a set of second training parking spaces which includes M number of second training parking spaces which are connected together, and each of which has a parking status that is one of an occupied status and a vacant status. One of the second training parking spaces is a target second training parking space. In this embodiment, a total number of the first training parking images equals that of the second training parking images, but implementation thereof is not limited to the disclosure herein. In one embodiment, the storage 91 of the computer system 9 stores the parking status of each of the first training parking spaces in the first training parking images, and the parking status of each of the second training parking spaces in the second training parking images.

Moreover, the first training parking images show K kinds of combinations of the parking statuses of the first training parking spaces, where $K=2^M$, i.e., the first training parking spaces have $2^M$ number of parking status combinations. In this embodiment, M is equal to three. That is to say, the first training parking images show eight kinds of combinations of the parking statuses of the three first training parking spaces. Similarly, the second training parking images show K kinds of combinations of the parking statuses of the second training parking spaces, and in this embodiment, the second training parking images show eight kinds of combinations of the parking statuses of the three second training parking spaces. The eight kinds of combinations of the parking statuses of the three first training parking spaces or the three second training parking spaces can be expressed as follows: {(0,0,0),(0,0,1),(0,1,0),(0,1,1),(1,0,0),(1,0,1),(1,1,0),(1,1,1)}, where "0" represents the vacant status and "1" represents the occupied status. In this embodiment, the target first training parking space is the middle one of the three parking spaces in the set of first training parking spaces, and the target second training parking space is the middle one of the three parking spaces in the set of second training parking spaces.

Figure 2:
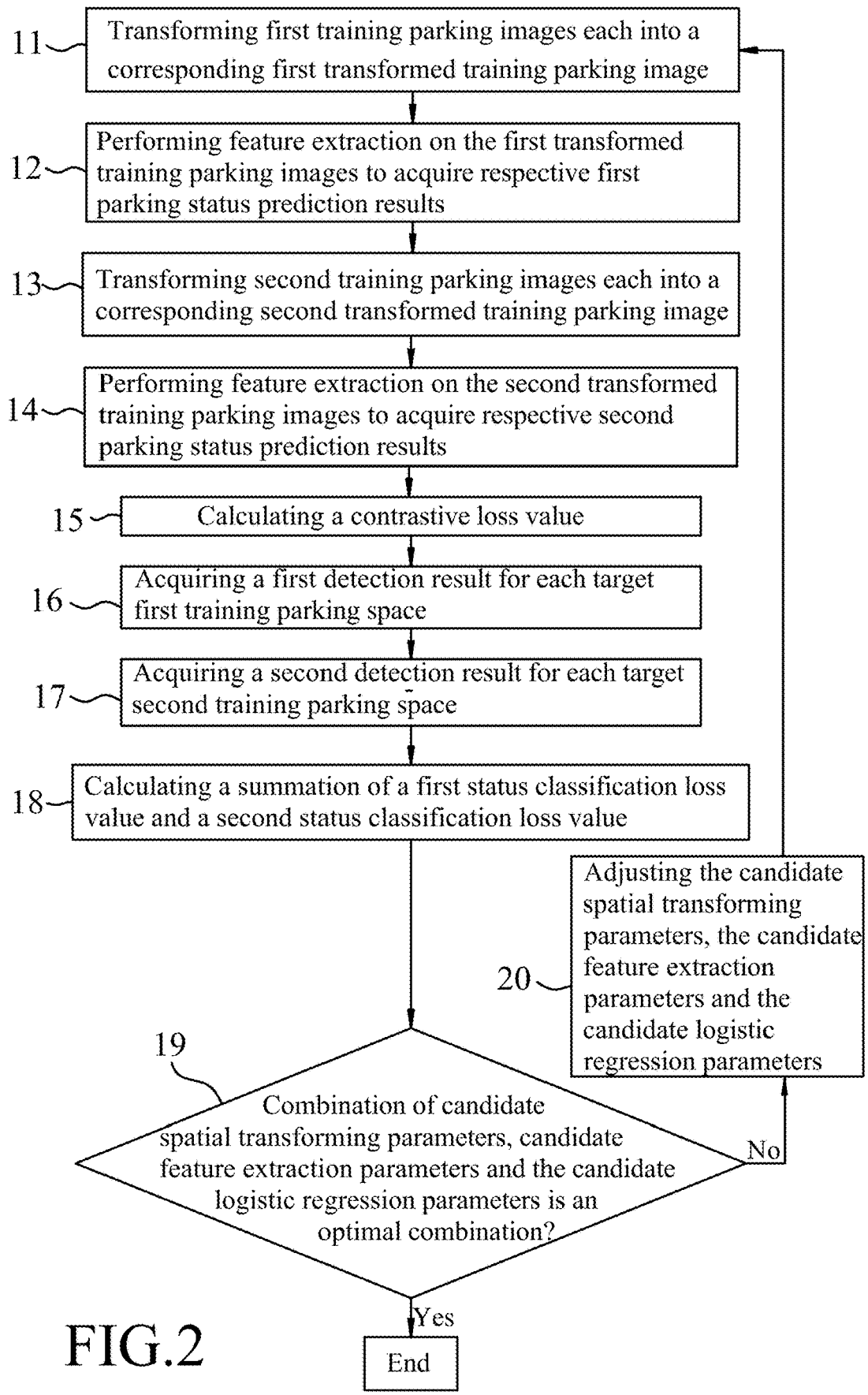
FIG. 2 is a flow chart illustrating a first embodiment of the method for establishing a parking space detection model according to the disclosure.
Figure 5:
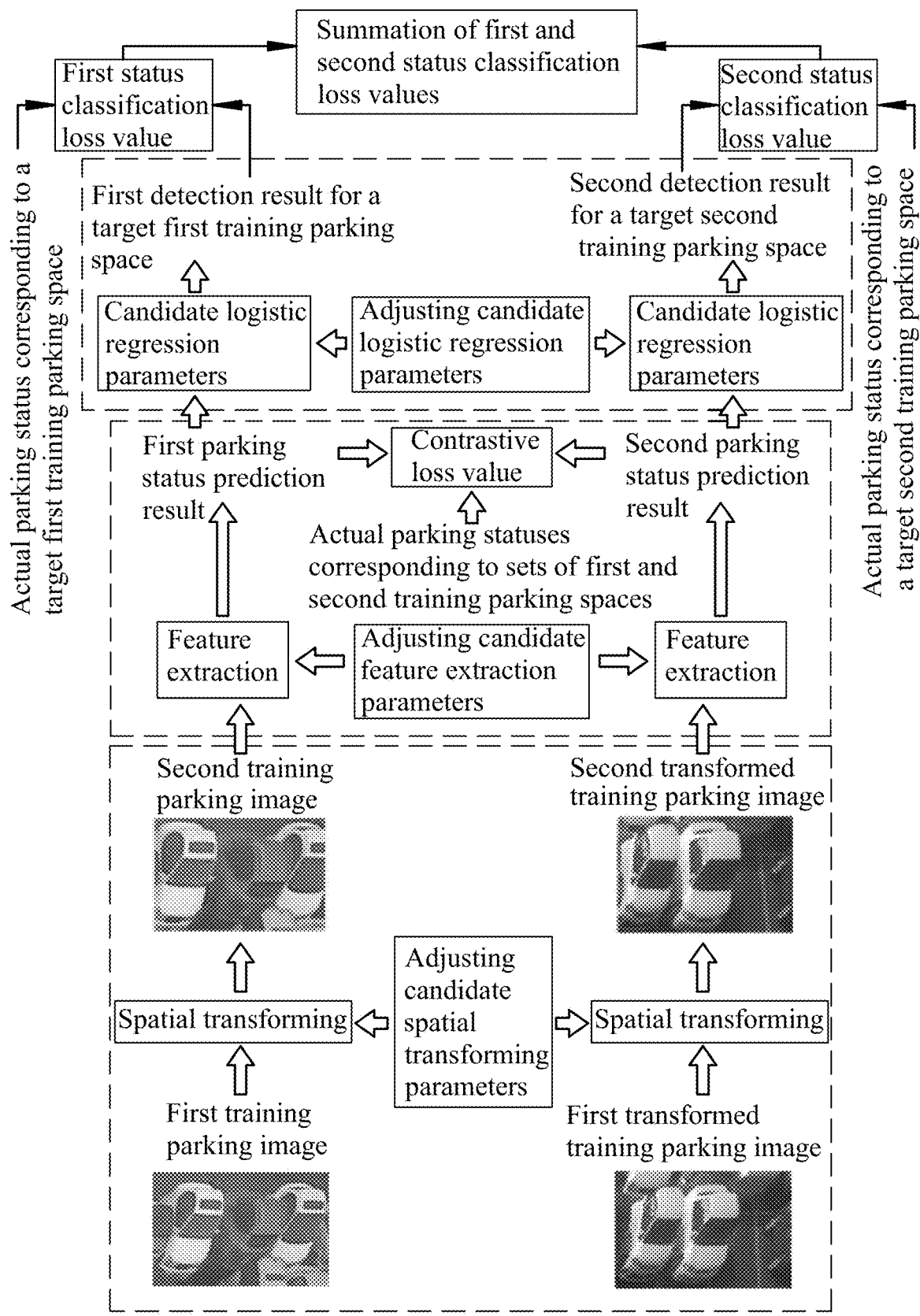
FIG. 5 is a schematic diagram illustrating the first embodiment of the method for establishing a parking space detection model according to the disclosure.

Referring to FIGS. 1, 2 and 5, a first embodiment of the method for establishing a parking space detection model according to the disclosure is illustrated. The first embodiment of the method for establishing a parking space detection model is implemented by means of contrastive learning, a flow structure of which is symmetric (see FIG. 5). The first embodiment of the method for establishing a parking space detection model according to the disclosure includes steps 11 to 20 described as follows.

In step 11, the processor 92 of the computer system 9 transforms each of the first training parking images into a corresponding first transformed training parking image based on a set of candidate spatial transforming parameters $W_\theta$. Each of the first training parking images and the first transformed training parking images includes a plurality of pixels each having a pixel value and a set of pixel coordinates.

Figure 3:
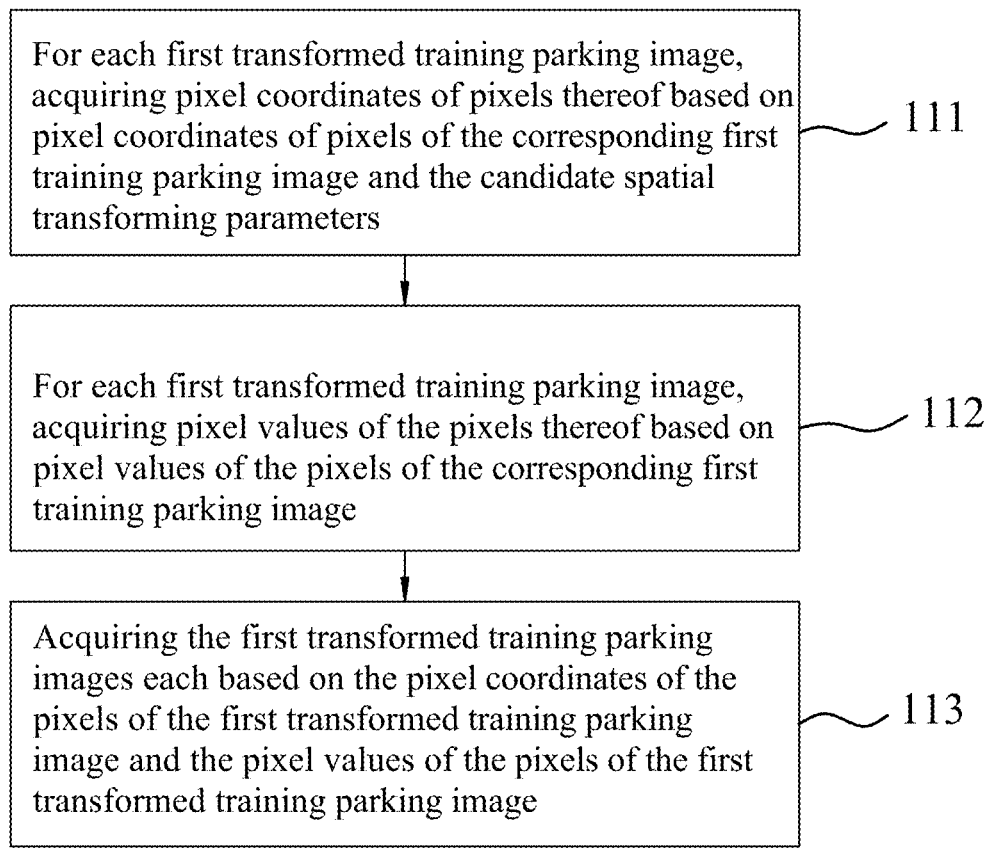
FIG. 3 is a flow chart illustrating an embodiment of sub-steps of step 11 of the method for establishing a parking space detection model according to the disclosure.

Specifically speaking, referring to FIG. 3, step 11 includes sub-steps 111 to 113 described as follows.

In sub-step 111, for each of the first transformed training parking images, the processor 92 of the computer system 9 acquires the pixel coordinates of the pixels of the first transformed training parking image based on the pixel coordinates of the pixels of the corresponding one of the first training parking images and the candidate spatial transforming parameters $W_\theta$. The pixel coordinates of the pixels of the first transformed training parking image are acquired according to:

$$\begin{pmatrix} x_i^S \\ y_i^S \end{pmatrix} = T_\theta(G_i) = \begin{bmatrix} \theta_{11} & \theta_{12} & \theta_{13} \\ \theta_{21} & \theta_{22} & \theta_{23} \end{bmatrix} \begin{pmatrix} x_i^t \\ y_i^t \\ 1 \end{pmatrix},$$

where $(x_i^S, y_i^S)$ represents the pixel coordinates of an $i^{th}$ one of the pixels of the corresponding one of the first training parking images; $\theta_{11}$, $\theta_{12}$, $\theta_{13}$, $\theta_{21}$, $\theta_{22}$ and $\theta_{23}$ are the candidate spatial transforming parameters $W_\theta$ for a transformation model $T_\theta(\cdot)$; and $G_i=(x_i^t,y_i^t)$ represents the pixel coordinates of an $i^{th}$ one of the pixels of the first transformed training parking image.

In sub-step 112, for each of the first transformed training parking images, the processor 92 of the computer system 9 acquires the pixel values of the pixels of the first transformed training parking image based on the pixel values of the pixels of the corresponding one of the first training parking images. The pixel values of the pixels of the first transformed training parking image are acquired according to:

$$X_{\theta_i} = \sum_{n=0}^{H} \sum_{m=0}^{W} X_{nm} \cdot \max(0, 1 - |x_i^S - m|) \cdot \max(0, 1 - |y_i^S - n|),$$

where $X_{\theta_i}$ represents the pixel value of the $i^{th}$ one of the pixels of the first transformed training parking image; $X_{nm}$ represents the pixel value of one of the pixels, which has the pixel coordinates of (m,n), of the corresponding one of the first training parking images; H represents a height of the corresponding one of the first training parking images; and W represents a width of the corresponding one of the first training parking images.

In sub-step 113, the processor 92 of the computer system 9 acquires the first transformed training parking images, each based on the pixel coordinates of the pixels of the first transformed training parking image acquired in sub-step 111 and the pixel values of the pixels of the first transformed training parking image acquired in sub-step 112.

In step 12, the processor 92 of the computer system 9 performs feature extraction on each of the first transformed training parking images based on a set of candidate feature extraction parameters $W_F$, to acquire a first parking status prediction result $G_{W_F}(G_{W_\theta}(X_n^l))$ relating to the first training parking spaces shown in one of the first training parking images that corresponds to the first transformed training parking image, where $X_n^l$ represents a set of the pixel values of the pixels of an $n^{th}$ one of the first training parking images; $G_{W_\theta}(\cdot)$ represents a spatial transforming equation defined by the candidate spatial transforming parameters $W_\theta$ and performed in sub-step 111; $G_{W_F}(\cdot)$ represents a feature extracting equation defined by the set of candidate feature extraction parameters $W_F$. It should be noted that in this embodiment, the feature extraction equation $G_{W_F}(\cdot)$ defined by the set of candidate feature extraction parameters $W_F$ is implemented by a Convolutional Neural Network (CNN), and each of the first parking status prediction results $G_{W_F}(G_{W_\theta}(X_n^l))$ includes a plurality of feature values that correspond respectively to eight feature dimensions. In other embodiments, each of the first parking status prediction results $G_{W_F}(G_{W_\theta}(X_n^l))$ includes a probability of occurrence of each of the K kinds, i.e., the $2^M$ kinds, of combinations of the parking statuses of the first training parking spaces.

In step 13, the processor 92 of the computer system 9 transforms each of the second training parking images into a corresponding second transformed training parking image based on the candidate spatial transforming parameters $W_\theta$. It is worth noting that the processor 92 of the computer system 9 transforms the second training parking images into the corresponding second transformed training parking images in step 13 in an identical way as transforming the first training parking images into the corresponding first transformed training parking images in step 11. Therefore, details of step 13 will be omitted herein for the sake of brevity.

In step 14, the processor 92 of the computer system 9 performs feature extraction on each of the second transformed training parking images based on the candidate feature extraction parameters $W_F$, to acquire a corresponding second parking status prediction result $G_{W_F}(G_{W_\theta}(X_n^r))$ relating to the second training parking spaces shown in one of the second training parking images that corresponds to the second transformed training parking image, where $X_n^r$ represents a set of the pixel values of the pixels of an $n^{th}$ one of the second training parking images. It is worth noting that the feature extraction performed on the second transformed training parking images in step 14 is identical to that performed on the first transformed training parking images in step 12. Therefore, details of step 14 will be omitted herein for the sake of brevity. Additionally, the order of execution of steps 11 to 12 and steps 13 to 14 is arbitrary. In other words, although steps 11 to 12 are executed prior to steps 13 to 14 in this embodiment, steps 13 to 14 may be executed prior to or in parallel with steps 11 to 12 in other embodiments.

In step 15, the processor 92 of the computer system 9 calculates a contrastive loss value based on the first parking status prediction results relating to the first training parking images, the parking status of each of the first training parking spaces in each of the first training parking images, the second parking status prediction results relating to the second training parking images, and the parking status of each of the second training parking spaces in each of the second training parking images. The contrastive loss value is calculated according to:

$$L_1 = \frac{1}{2N} \sum_{n=1}^{N} (F_n) \cdot (D_n^{CF})^2 + (1 - F_n) \cdot \{\max(0, \alpha_n - D_n^{CF})\}^2,$$

where $L_1$ represents the contrastive loss value; N represents the total number of the first training parking images, which is equal to the total number of the second training parking images; $F_n$ is an index that indicates whether the parking statuses of the first training parking spaces in an $n^{th}$ one of the first training parking images are identical to the parking statuses of the second training parking spaces in an $n^{th}$ one of the second training parking images, in which $F_n=0$ indicates that the parking statuses of the first training parking spaces in the $n^{th}$ one of the first training parking images are not identical to the parking statuses of the second training parking spaces in the $n^{th}$ one of the second training parking images, and $F_n=1$ indicates that the parking statuses of the first training parking spaces in the $n^{th}$ one of the first training parking images are identical to the parking statuses of the second training parking spaces in the $n^{th}$ one of the second training parking images; $\alpha_n$ is a predetermined constant; and $D_n^{CF}$ represents a contrastive feature distance, and is calculated according to:

$$D_n^{CF} = \|G_{W_F}(G_{W_\theta}(X_n^l)) - G_{W_F}(G_{W_\theta}(X_n^r))\|_2,$$

where $G_{W_F}(G_{W_\theta}(X_n^l))$ represents the first parking status prediction result that corresponds to the $n^{th}$ one of the first training parking images; $G_{W_F}(G_{W_\theta}(X_n^r))$ represents the second parking status prediction result that corresponds to the $n^{th}$ one of the second training parking images; $G_{W_\theta}(\bullet)$ represents the spatial transforming equation; $G_{W_F}(\bullet)$ represents the feature extracting equation; $X_n^l$ represents the set of the pixel values of the pixels of the $n^{th}$ one of the first training parking images; and $X_n^r$ represents the set of the pixel values of the pixels of the $n^{th}$ one of the second training parking images. It is worth to note that $\alpha_n$ represents a count of difference in parking statuses between the first training parking spaces in the $n^{th}$ one of the first training parking images and the second training parking spaces in the $n^{th}$ one of the second training parking images. For example, $\alpha_n$ is equal to two when the parking statuses of the first training parking spaces in the $n^{th}$ one of the first training parking images and the parking statuses of the second training parking spaces in the $n^{th}$ one of the second training parking images are expressed respectively as (0,1,0) and (0,0,1). Moreover, $\alpha_n$ should be smaller than $D_n^{CF}$ when the candidate feature extraction parameters $W_F$ are optimal under a condition that $F_n$=0.

In step 16, for each of the first transformed training parking images, the processor 92 of the computer system 9 acquires a first detection result for the target first training parking space based on a set of candidate logistic regression parameters $W_C$ and the first parking status prediction result that corresponds to the first transformed training parking image. The first detection result for the target first training parking space is acquired according to:

$$S_n^i = \frac{\exp(p_n \cdot W_C^i)}{\exp(p_n \cdot W_C^1) + \exp(p_n \cdot W_C^0)},$$

where $S_n^i$ represents the first detection result for the target first training parking space in an $n^{th}$ one of the first training parking images, and indicates a probability of one of the occupied status and the vacant status calculated for the target first training parking space shown in the $n^{th}$ one of the first training parking images, $i \in [0,1]$, in which i=0 represents the vacant status, and i=1 represents the occupied status, $S_n^1 + S_n^0 = 1$; $p_n$ represents the first parking status prediction result $G_{W_F}(G_{W_\theta}(X_n^I))$ relating to the first training parking spaces shown in the $n^{th}$ one of the first training parking images; and $W_C^0$ and $W_C^1$ are the candidate logistic regression parameters $W_C$.

In step 17, for each of the second transformed training parking images, the processor 92 of the computer system 9 acquires a second detection result for the target second training parking space based on the candidate logistic regression parameters $W_C$ and the second parking status prediction result that corresponds to the second transformed training parking image. The second detection result for the target second training parking space is acquired according to:

$$S_n'^i = \frac{\exp(p_n' \cdot W_C^i)}{\exp(p_n' \cdot W_C^1) + \exp(p_n' \cdot W_C^0)},$$

where $S_n'^i$, represents the second detection result for the target second training parking space in an $n^{th}$ one of the second training parking images, and indicates a probability of one of the occupied status and the vacant status calculated for the target second training parking space shown in the $n^{th}$ one of the second training parking images, $i \in [0,1]$, in which i=0 represents the vacant status, and i=1 represents the occupied status, $S_n'^1 + S_n'^0 = 1$; $p_n'$ represents the second parking status prediction result $G_{W_F}(G_{W_\theta}(X))$ relating to the second training parking spaces shown in the $n^{th}$ one of the second training parking images; and $W_C^0$ and $W_C^1$ are the candidate logistic regression parameters $W_C$.

Figure 4:
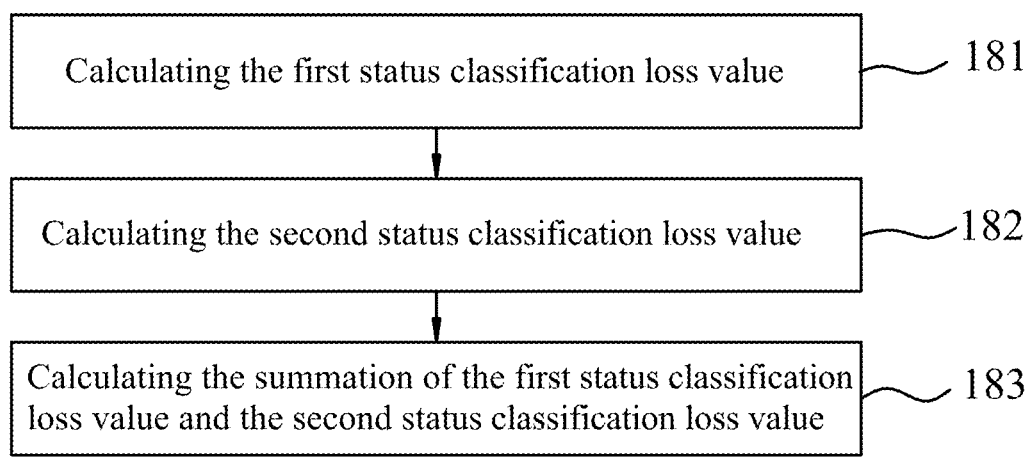
FIG. 4 is a flow chart illustrating an embodiment of sub-steps of step 18 of the method for establishing a parking space detection model according to the disclosure.

In step 18, the processor 92 of the computer system 9 calculates a summation of a first status classification loss value and a second status classification loss value. Specifically speaking, step 18 further includes sub-steps 181 to 183 described as follows and illustrated in FIG. 4.

In step 181, the processor 92 of the computer system 9 calculates the first status classification loss value based on the first detection results that respectively correspond to the first transformed training parking images and the parking statuses of the target first training parking spaces in the first training parking images. The first status classification loss value is calculated according to:

$$L_3 = -\frac{1}{N}\sum_{n=1}^{N}[y_n \log(S_n^1) + (1-y_n)\log(S_n^0)],$$

where $L_3$ represents the first status classification loss value; N represents a total number of the first training parking images; $y_n$ represents the parking status of the target first training parking space shown in the $n^{th}$ one of the first training parking images, $y_n \in [0,1]$, in which $y_n$=0 indicates that the parking status of the target first training parking space is the vacant status, and $y_n$=1 indicates that the parking status of the target first training parking space is the occupied status; $S_n^0$ represents the first detection result for the target first training parking space in the $n^{th}$ one of the first training parking images, and indicates a probability of the vacant status calculated for the target first training parking space shown in the $n^{th}$ one of the first training parking images; and $S_n^1$ represents the first detection result for the target first training parking space in the $n^{th}$ one of the first training parking images, and indicates a probability of the occupied status calculated for the target first training parking space shown in the $n^{th}$ one of the first training parking images, $S_n^1 + S_n^0 = 1$.

In step 182, the processor 92 of the computer system 9 calculates the second status classification loss value based on the second detection results that respectively correspond to the second transformed training parking images and the parking statuses of the target second training parking spaces in the second training parking images. The second status classification loss value is calculated according to:

$$L_4 = -\frac{1}{N}\sum_{n=1}^{N}[y_n' \log(S_n'^1) + (1-y_n')\log(S_n'^0)],$$

where $L_4$ represents the second status classification loss value; N represents a total number of the second training parking images, which is equal to the total number of the first training parking images; $y_n'$ represents the parking status of the target second training parking space shown in the $n^{th}$ one of the second training parking images, $y_n' \in [0,1]$, in which $y_n'$=0 indicates that the parking status of the target second training parking space is the vacant status, and $y_n'$=1 indicates that the parking status of the target second training parking space is the occupied status; $S_n'^0$ represents the second detection result for the target second training parking space in the $n^{th}$ one of the second training parking images, and indicates a probability of the vacant status calculated for the target second training parking space shown in the $n^{th}$ one of the second training parking images; and $S_n'^1$ represents the second detection result for the target second training parking space in the $n^{th}$ one of the second training parking images, and indicates a probability of the occupied status calculated for the target second training parking space shown in the $n^{th}$ one of the second training parking images, $S'^1_n + S'^0_n = 1$.

In step 183, the processor 92 of the computer system 9 calculates the summation of the first status classification loss value and the second status classification loss value.

In step 19, the processor 92 of the computer system 9 determines whether a combination of the candidate spatial transforming parameters $W_\Theta$, the candidate feature extraction parameters $W_F$ and the candidate logistic regression parameters $W_C$ is an optimal combination based on the contrastive loss value and the summation of the first status classification loss value and the second status classification loss value. Specifically speaking, the processor 92 of the computer system 9 calculates an objective value by adding the summation of the first status classification loss value and the second status classification loss value to the contrastive loss value that has been weighted. Thereafter, the processor 92 of the computer system 9 determines based on the objective value thus calculated whether the combination of the candidate spatial transforming parameters $W_\Theta$, the candidate feature extraction parameters $W_F$ and the candidate logistic regression parameters $W_C$ is an optimal combination based on the object value. When it is determined that that the combination of the candidate spatial transforming parameters $W_\Theta$, the candidate feature extraction parameters $W_F$ and the candidate logistic regression parameters $W_C$ is an optimal combination, a flow of the method for establishing a parking space detection model proceeds to an end.

Otherwise, when it is determined in step 19 that the combination of the candidate spatial transforming parameters $W_\Theta$, the candidate feature extraction parameters $W_F$ and the candidate logistic regression parameters $W_C$ is not an optimal combination, as shown in step 20, the processor 92 of the computer system 9 adjusts, by, for example trial and error, the candidate spatial transforming parameters $W_\Theta$, the candidate feature extraction parameters $W_F$ and the candidate logistic regression parameters $W_C$, followed by repeating steps 11 to 19 using the candidate spatial transforming parameters $W_\Theta$, the candidate feature extraction parameters $W_F$ and the candidate logistic regression parameters $W_C$ thus adjusted.

It should be noted that in this embodiment, for each round of repeating steps 11 to 19, the processor 92 of the computer system 9 determines that the combination of the candidate spatial transforming parameters $W_\Theta$, the candidate feature extraction parameters $W_F$ and the candidate logistic regression parameters $W_C$ is an optimal combination when it is determined by the processor 92 of the computer system 9 that a difference between the greatest one and the smallest one of the objective values, which are obtained in current and previous P (P≤1) rounds of performing steps 11 to 19, is smaller than a predetermined threshold. For example, assuming that the predetermined threshold is 0.5 and that the objective values obtained in the current and previous three rounds of performing steps 11 to 19 are respectively 1.8, 2, 1.7 and 2.1, the processor 92 of the computer system 9 will determine that the combination of the candidate spatial transforming parameters $W_\Theta$, the candidate feature extraction parameters $W_F$ and the candidate logistic regression parameters $W_C$ is an optimal combination because a difference between the greatest one, i.e., 2.1, and the smallest one, i.e., 1.7, of the objective values obtained in the current and previous three rounds of performing steps 11 to 19 is 0.4, which is smaller than the predetermined threshold, i.e., 0.5.

Figure 6:
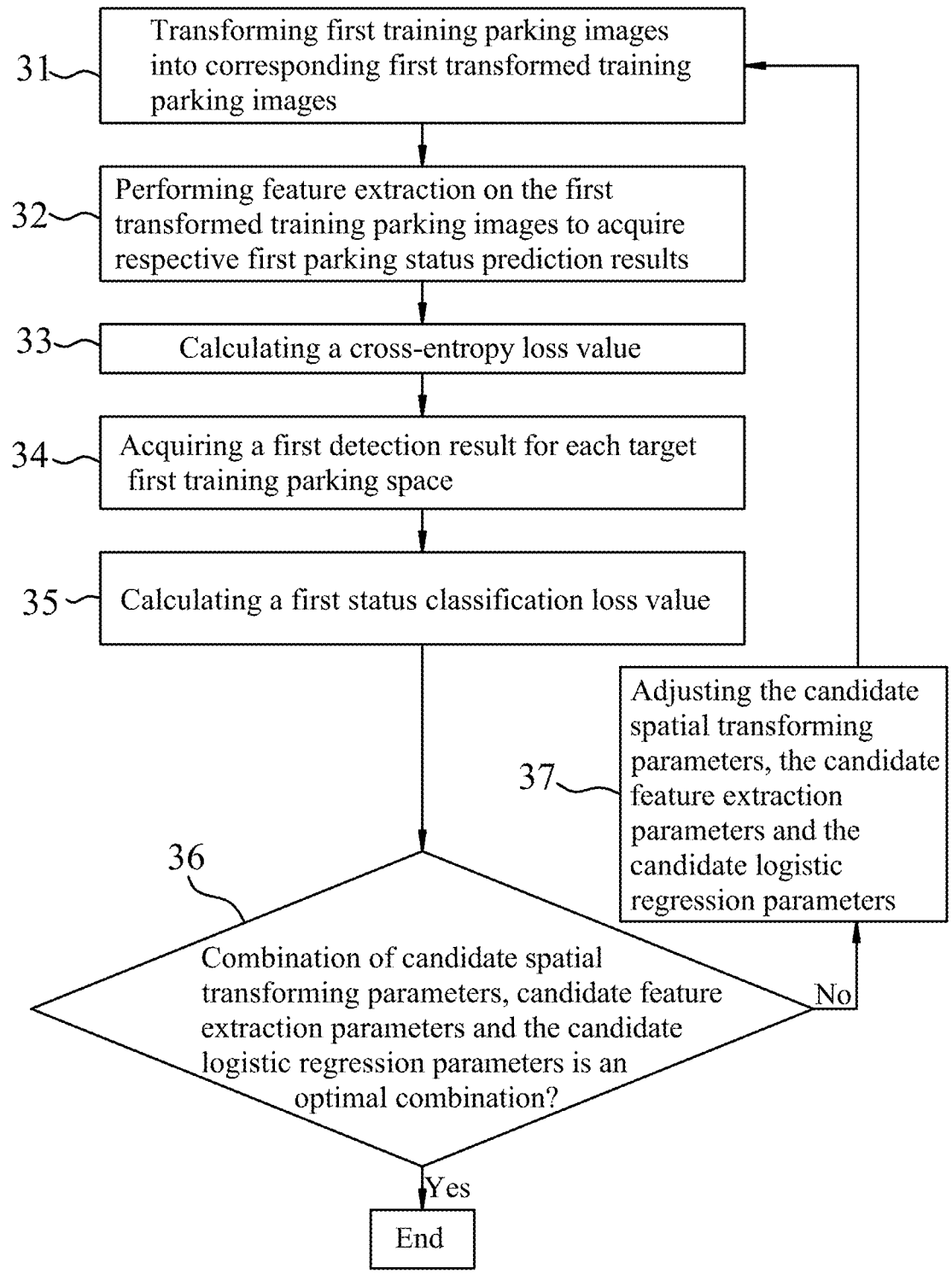
FIG. 6 is a flow chart illustrating a second embodiment of the method for establishing a parking space detection model according to the disclosure.
Figure 7:
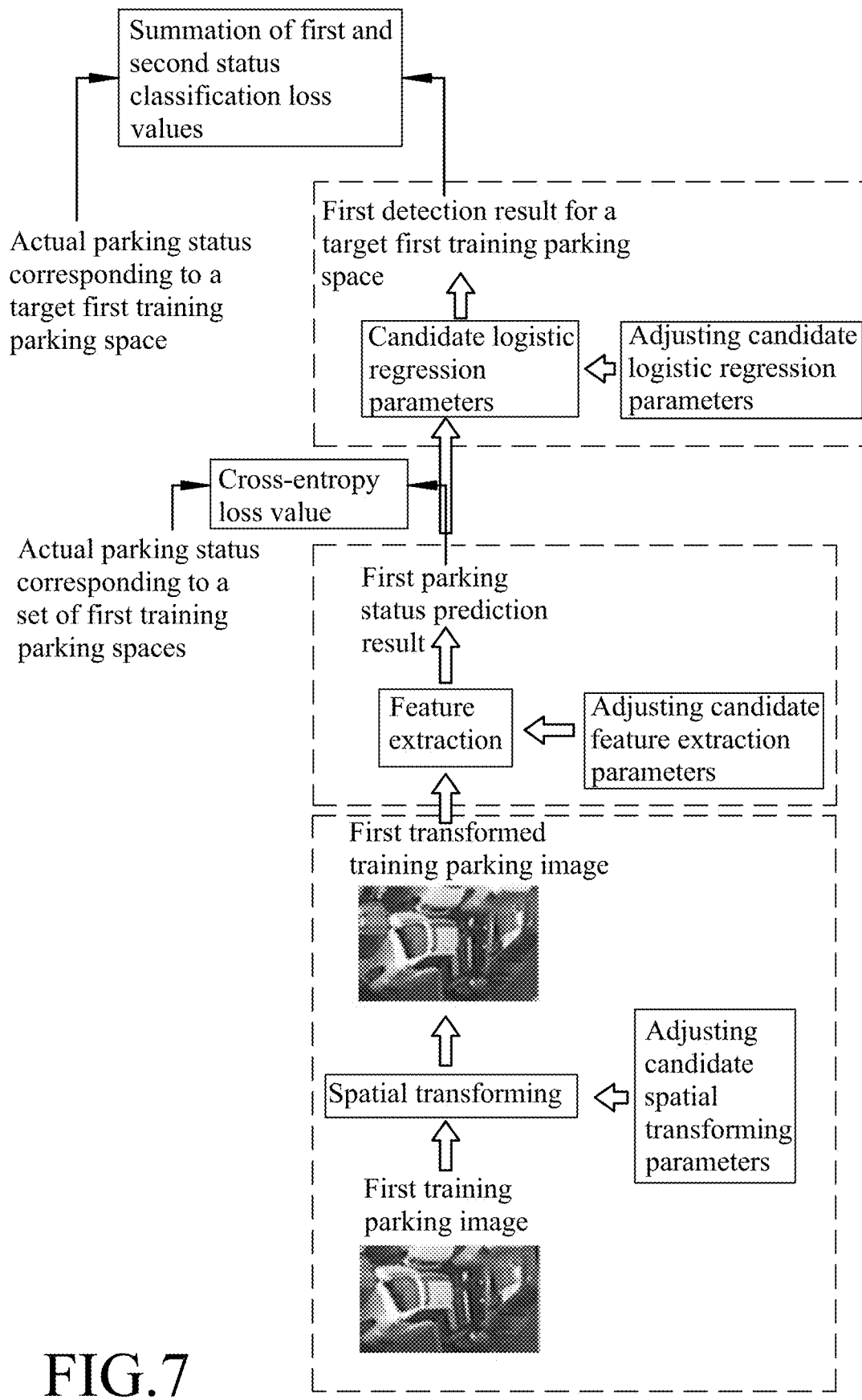
FIG. 7 is a schematic diagram illustrating the second embodiment of the method for establishing a parking space detection model according to the disclosure.

Referring to FIGS. 1, 6 and 7, a second embodiment of the method for establishing a parking space detection model according to the disclosure is illustrated. The second embodiment of the method for establishing a parking space detection model is a variant of the first embodiment, and includes steps 31 to 37 as shown in FIG. 6 and described as follows. Since steps 31, 32, 34, 36 and 37 of the second embodiment are respectively similar to steps 11, 12, 16, 19 and 20 of the first embodiment, details thereof will be omitted herein for the sake of brevity. It should be noted that the storage 91 of the computer system 9 does not store the second training parking images. In this embodiment, each of the first parking status prediction results includes a probability of occurrence of each of the K kinds, i.e., the $2^M$ kinds, of combinations of the parking statuses of the parking spaces.

In step 33, the processor 92 of the computer system 9 calculates a cross-entropy loss value based on the first parking status prediction results relating to the first training parking images, and the parking status of each of the first training parking spaces in each of the first training parking images. The cross-entropy loss value is calculated according to:

$$L_5 = -\frac{1}{2^M N} \sum_{n=1}^{N} \sum_{k=1}^{2^M} [h_n^k \log p_n^k + (1 - h_n^k)\log(1 - p_n^k)],$$

where $L_5$ represents the cross-entropy loss value; N represents the total number of the first training parking images; M represents a number of the first training parking spaces that have $2^M$ number of parking status combinations; $h_n^k$ is an index that indicates whether the parking statuses of the first training parking spaces in an $n^{th}$ one of the first training parking images are identical to the parking statuses of the first training parking spaces in a $k^{th}$ one of the parking status combinations, $1 \leq k \leq 2^M$, in which $h_n^k = 0$ indicates that the parking statuses of the first training parking spaces in the $n^{th}$ one of the first training parking images are not identical to the parking statuses of the first training parking spaces in the $k^{th}$ one of the parking status combinations, and $h_n^k = 1$ indicates that the parking statuses of the first training parking spaces in the $n^{th}$ one of the first training parking images are identical to the parking statuses of the first training parking spaces in the $k^{th}$ one of the parking status combinations; and $p_n^k$ represents the first parking status prediction result, and indicates a probability of the $k^{th}$ one of the parking status combinations for the first training parking spaces shown in the $n^{th}$ one of the first training parking images, $P_n^1 + P_n^2 + \ldots + P_n^{2^M-1} + P_n^{2^M} = 1$.

In step 35, the processor 92 of the computer system 9 calculates a first status classification loss value based on the first detection results that respectively correspond to the first transformed training parking images and the parking statuses of all the target first training parking spaces in the first training parking images. The first status classification loss value is calculated according to:

$$L_2 = -\frac{1}{N} \sum_{n=1}^{N} [y_n \log(S_n^1) + (1 - y_n)\log(S_n^0)],$$

where $L_2$ represents the first status classification loss value; N represents a total number of the first training parking images; $y_n$ represents the parking status of the target first training parking space shown in the $n^{th}$ one of the first training parking images, $y_n \in [0,1]$, in which $y_n=0$ indicates that the parking status of the target first training parking space is the vacant status, and $y_n=1$ indicates that the parking status of the target first training parking space is the occupied status.

In step 36, the processor 92 of the computer system 9 determines whether the combination of the candidate spatial transforming parameters $W_\theta$, the candidate feature extraction parameters $W_F$ and the candidate logistic regression parameters $W_C$ is an optimal combination based on the first status classification loss value and the cross-entropy loss value.

FIG. 7 is a schematic diagram providing auxiliary explanation for the second embodiment of the method for establishing a parking space detection model.

Figure 8:
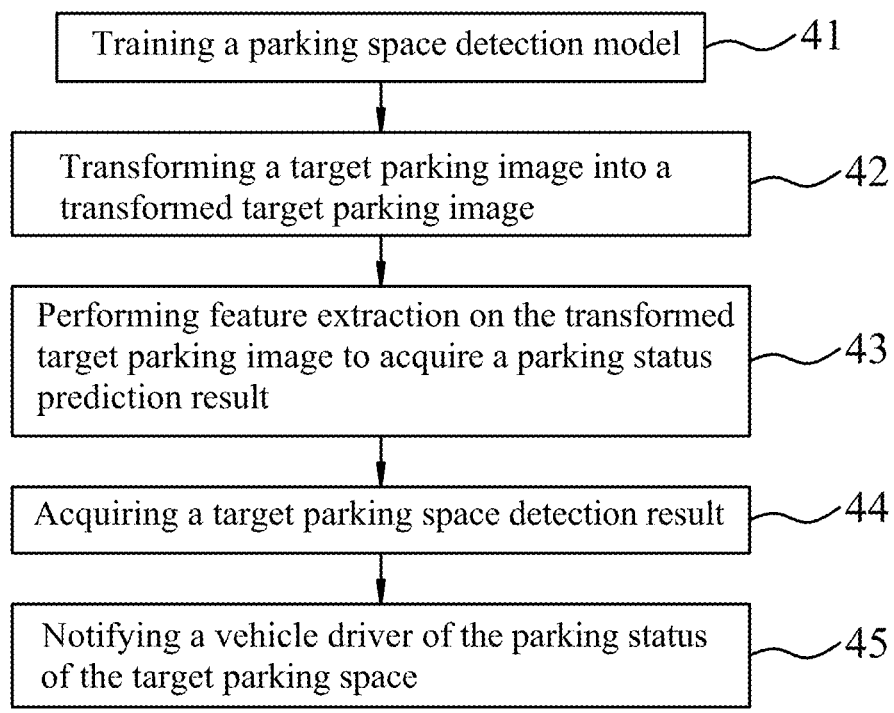
FIG. 8 is a flow chart illustrating an embodiment of a method of detecting parking spaces for a parking lot according to the disclosure.

Referring to FIGS. 1 and 8, an embodiment of the method of detecting parking spaces for a parking lot according to the disclosure is illustrated. In this embodiment, the storage 91 of the computer system 9 stores a plurality of training parking images, wherein each of the training parking images shows therein a set of M number of training parking spaces which are connected together, and each of which has a parking status that is one of the occupied status and the vacant status. Each of the training parking images shows one of K kinds of combinations of the parking statuses of the training parking spaces, where $K=2^M$. The method of detecting parking spaces for a parking lot includes steps 41 to 45 described as follows.

In step 41, the processor 92 of the computer system 9 trains a parking space detection model based on the training parking images to acquire, for the parking space detection model, a set of spatial transforming parameters $W_\theta$ defining the spatial transforming equation $G_{W_\theta}(\cdot)$, a set of feature extraction parameters $W_F$ defining the feature extracting equation $G_{W_F}(\cdot)$, and a set of logistic regression parameters $W_C$. It should be noted that the training parking images in the embodiment of the method of detecting parking spaces for a parking lot may be implemented by the first training parking images and the second training parking images that are described in the first embodiment of the method for establishing a parking space detection model. However, in other embodiments, the training parking images may be implemented by merely the first training parking images that are described in the first embodiment of the method for establishing a parking space detection model.

In step 42, the processor 92 of the computer system 9 transforms a target parking image, which shows M number of parking spaces connected together and including a target parking space, into a transformed target parking image based on the spatial transforming parameters $W_\theta$ and the spatial transforming equation $G_{W_\theta}(\cdot)$.

In step 43, the processor 92 of the computer system 9 performs feature extraction on the transformed target parking image based on the feature extraction parameters $W_F$ and the feature extracting equation $G_{W_F}(\cdot)$ to acquire a parking status prediction result $G_{W_F}(G_{W_\theta}(X))$ relating to the parking spaces shown in the target parking image, where X represents a set of the pixel values of the pixels of the transformed target parking image.

In step 44, the processor 92 of the computer system 9 acquires a target parking space detection result $S^i$ for the target parking space based on the logistic regression parameters $W_C$ and the parking status prediction result $G_{W_F}(G_{W_\theta}(X))$. The target parking space detection result $S^i$ for the target parking space is acquired according to:

$$S^i = \frac{\exp(p \cdot W_C^i)}{\exp(p \cdot W_C^1) + \exp(p \cdot W_C^0)},$$

where $S^i$ represents the target parking space detection result for the target parking space in the target parking image, and indicates a probability of one of the occupied status and the vacant status calculated for the target parking space in the target parking image, $i \in [0,1]$, in which $i=0$ represents the vacant status, and $i=1$ represents the occupied status, $S^1+S^0=1$; p represents the parking status prediction result relating to the target parking space in the target parking image; and $W_C^0$ and $W_C^1$ are the candidate logistic regression parameters.

In step 45, the processor 92 of the computer system 9 notifies a vehicle driver of the parking status of the target parking space based on the target parking space detection result. In one embodiment, a display is utilized to show the parking status of the target parking space to the vehicle driver. In one embodiment, a speaker is utilized to indicate the vehicle driver of the parking status of the target parking space by sound. In one embodiment, a signal light is utilized to indicate the parking status of the target parking space to the vehicle driver.

In summary, the method for establishing a parking space detection model according to this disclosure utilizes the processor 92 of the computer system 9 to establish the parking space detection model by adjusting the candidate spatial transforming parameters $W_\theta$ for the spatial transforming equation $G_{W_\theta}(\cdot)$, the candidate feature extraction parameters $W_F$ for the feature extracting equation $G_{W_F}(\cdot)$, and the candidate logistic regression parameters $W_C$ until that the combination of the candidate spatial transforming parameters $W_\theta$, the candidate feature extraction parameters $W_F$ and the candidate logistic regression parameters $W_C$ is an optimal combination based on the first status classification loss value, the second status classification loss value and the contrastive loss value, or based on the first status classification loss value and the cross-entropy loss value. Additionally, the method of detecting parking spaces for a parking lot according to this disclosure utilizes the processor 92 of the computer system 9 to notify a vehicle driver of the parking status of the target parking space based on the target parking space detection result obtained according to the candidate spatial transforming parameters $W_\theta$, the candidate feature extraction parameters $W_F$ and the candidate logistic regression parameters $W_C$ finalized through the method for establishing a parking space detection model. The spatial transforming equation $G_{W_\theta}(\cdot)$ is utilized to adaptively crop image areas in the target parking image so as to alleviate issues that would adversely influence parking space detection, such as deviation of a parked vehicle from a parking space and divergent vehicle sizes. Moreover, means of deep network is utilized to realize the feature extracting equation $G_{W_F}(\cdot)$ so as to mitigate issues that would adversely influence the parking space detection, such as dynamic lighting variations, inter-object occlusion and perspective distortion.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for establishing a parking space detection model, comprising:
   step (A): providing a computer system that stores a plurality of first training parking images, wherein each of the first training parking images shows therein a set of first training parking spaces which are connected together, and each of which has a parking status that is one of an occupied status and a vacant status, one of the first training parking spaces being a target first training parking space, the computer system further storing the parking status of the target first training parking space in each of the first training parking images;
   step (B): transforming, by the computer system, each of the first training parking images into a corresponding first transformed training parking image based on a set of candidate spatial transforming parameters;
   step (C): performing, by the computer system, feature extraction on each of the first transformed training parking images, which respectively correspond to the first training parking images, based on a set of candidate feature extraction parameters, so as to acquire a first parking status prediction result relating to the first training parking spaces shown in one of the first training parking images that corresponds to the first transformed training parking image;
   step (D): acquiring, for each of the first transformed training parking images and by the computer system, a first detection result for the target first training parking space based on a set of candidate logistic regression parameters and the first parking status prediction result that corresponds to the first transformed training parking image;
   step (E): calculating, by the computer system, a first status classification loss value based on the first detection results that respectively correspond to the first transformed training parking images and the parking statuses of the target first training parking spaces in the first training parking images;
   step (F): determining, by the computer system and based on at least the first status classification loss value, whether a combination of the set of candidate spatial transforming parameters, the set of candidate feature extraction parameters and the set of candidate logistic regression parameters is an optimal combination; and
   step (G): adjusting, by the computer system, the set of candidate spatial transforming parameters, the set of candidate feature extraction parameters and the set of candidate logistic regression parameters when it is determined in step (F) that the combination of the set of candidate spatial transforming parameters, the set of candidate feature extraction parameters and the set of candidate logistic regression parameters is not an optimal combination, followed by repeating steps (B) to (F) using the set of candidate spatial transforming parameters, the set of candidate feature extraction parameters and the set of candidate logistic regression parameters thus adjusted.

2. The method of claim 1, wherein each of the first training parking images and the first transformed training parking images includes a plurality of pixels each having a pixel value and a set of pixel coordinates, and step (B) includes:
   sub-step (B-1): acquiring, for each of the first transformed training parking images, the pixel coordinates of the pixels of the first transformed training parking image based on the pixel coordinates of the pixels of the corresponding one of the first training parking images and the set of candidate spatial transforming parameters;
   sub-step (B-2): acquiring, for each of the first transformed training parking images, the pixel values of the pixels of the first transformed training parking image based on the pixel values of the pixels of the corresponding one of the first training parking images;
   sub-step (B-3): acquiring the first transformed training parking images each based on the pixel coordinates of the pixels of the first transformed training parking image acquired in sub-step (B-1), and the pixel values of the pixels of the first transformed training parking image acquired in sub-step (B-2).

3. The method of claim 2, wherein, in sub-step (B-1), the pixel coordinates of the pixels of the first transformed training parking image are acquired according to:

$$\begin{pmatrix} x_i^S \\ y_i^S \end{pmatrix} = \begin{bmatrix} \theta_{11} & \theta_{12} & \theta_{13} \\ \theta_{21} & \theta_{22} & \theta_{23} \end{bmatrix} \begin{pmatrix} x_i^t \\ y_i^t \\ 1 \end{pmatrix},$$

where $(x_i^S, y_i^S)$ represents the pixel coordinates of an $i^{th}$ one of the pixels of the corresponding one of the first training parking images; $\theta_{11}$, $\theta_{12}$, $\theta_{13}$, $\theta_{21}$, $\theta_{22}$ and $\theta_{23}$ are the set of candidate spatial transforming parameters; and $(x_i^t, y_i^t)$ represents the pixel coordinates of an $i^{th}$ one of the pixels of the first transformed training parking image; and wherein, in sub-step (B-2), the pixel values of the pixels of the first transformed training parking image are acquired according to:

$$X_{\theta_i} = \sum_{n=0}^{H} \sum_{m=0}^{W} X_{nm} \cdot \max(0, 1 - |x_i^S - m|) \cdot \max(0, 1 - |y_i^S - n|),$$

where $X_{\theta_i}$ represents the pixel value of the $i^{th}$ one of the pixels of the first transformed training parking image; $X_{nm}$ represents the pixel value of one of the pixels, which has the pixel coordinates of (m,n), of the corresponding one of the first training parking images; H represents a height of the corresponding one of the first training parking images; and W represents a width of the corresponding one of the first training parking images.

4. The method of claim 1, wherein, in step (D), the first detection result for the target first training parking space is acquired according to:

$$S_n^i = \frac{\exp(p_n \cdot W_C^i)}{\exp(p_n \cdot W_C^1) + \exp(p_n \cdot W_C^0)},$$

where $S_n^i$ represents the first detection result for the target first training parking space in an $n^{th}$ one of the first training parking images, and indicates a probability of one of the occupied status and the vacant status calculated for the target first training parking space shown in the $n^{th}$ one of the first training parking images, $i \in [0,1]$, in which $i=0$ represents the vacant status, and $i=1$ represents the occupied status, $S_n^1 + S_n^0 = 1$; $p_n$ represents the first parking status prediction result relating to the first training parking spaces shown in the $n^{th}$ one of the first training parking images; and $W_C^0$ and $W_C^1$ are the set of candidate logistic regression parameters.

5. The method of claim 4, wherein, in step (E), the first status classification loss value is calculated according to:

$$L_2 = -\frac{1}{N} \sum_{n=1}^{N} [y_n \log(S_n^1) + (1-y_n)\log(S_n^0)],$$

where $L_2$ represents the first status classification loss value; N represents a total number of the first training parking images; $y_n$ represents the parking status of the target first training parking space shown in the $n^{th}$ one of the first training parking images, $y_n \in [0,1]$, in which $y_n=0$ indicates that the parking status of the target first training parking space is the vacant status, and $y_n=1$ indicates that the parking status of the target first training parking space is the occupied status.

6. The method of claim 1, wherein the computer system further stores a plurality of second training parking images, and each of the second training parking images shows therein a set of second training parking spaces which are connected together, and each of which has a parking status that is one of an occupied status and a vacant status, one of the second training parking spaces being a target second training parking space, the computer system storing the parking status of each of the first training parking spaces in each of the first training parking images, and the parking status of each of the second training parking spaces in each of the second training parking images;

said method further comprising, before step (F):

step (H): transforming, by the computer system, each of the second training parking images into a corresponding second transformed training parking image based on the set of candidate spatial transforming parameters;

step (I): performing, by the computer system, feature extraction on each of the second transformed training parking images, which respectively correspond to the second training parking images, based on the set of candidate feature extraction parameters, so as to acquire a second parking status prediction result relating to the second training parking spaces shown in one of the second training parking images that corresponds to the second transformed training parking image;

step (J): acquiring, for each of the second transformed training parking images and by the computer system, a second detection result for the target second training parking space based on the set of candidate logistic regression parameters and the second parking status prediction result that corresponds to the second transformed training parking image;

step (K): calculating, by the computer system, a second status classification loss value based on the second detection results that respectively correspond to the second transformed training parking images and the parking statuses of the target second training parking spaces in the second training parking images; and step (L): calculating a contrastive loss value, by the computer system, based on the first parking status prediction results relating to the first training parking images, the parking status of each of the first training parking spaces in each of the first training parking images, the second parking status prediction results relating to the second training parking images, and the parking status of each of the second training parking spaces in each of the second training parking images;

wherein in step (F), the computer system determines whether the combination of the set of candidate spatial transforming parameters, the set of candidate feature extraction parameters and the set of candidate logistic regression parameters is an optimal combination based on the first status classification loss value, the second status classification loss value and the contrastive loss value.

7. The method of claim 6, wherein, in step (E), the first status classification loss value is calculated according to:

$$L_3 = -\frac{1}{N} \sum_{n=1}^{N} [y_n \log(S_n^1) + (1-y_n)\log(S_n^0)],$$

where $L_3$ represents the first status classification loss value; N represents a total number of the first training parking images; $y_n$ represents the parking status of the target first training parking space shown in an $n^{th}$ one of the first training parking images, $y_n \in [0,1]$, in which $y_n=0$ indicates that the parking status of the target first training parking space is the vacant status, and $y_n=1$ indicates that the parking status of the target first training parking space is the occupied status; $S_n^0$ represents the first detection result for the target first training parking space in the $n^{th}$ one of the first training parking images, and indicates a probability of the vacant status calculated for the target first training parking space shown in said one of the first training parking images; and $S_n^1$ represents the first detection result for the target first training parking space in the $n^{th}$ one of the first training parking images, and indicates a probability of the occupied status calculated for the target first training parking space shown in said one of the first training parking images, $S_n^1 + S_n^0 = 1$; and wherein in step (K), the second status classification loss value is calculated according to:

$$L_4 = -\frac{1}{N} \sum_{n=1}^{N} [y_n' \log(S_n'^1) + (1-y_n')\log(S_n'^0)],$$

where $L_4$ represents the second status classification loss value; N represents a total number of the second training parking images, which is equal to the total number of the first training parking images; $y_n^i$ represents the parking status of the target second training parking space shown in an $n^{th}$ one of the second training parking images, $y_n' \in [0,1]$, in which $y_n'=0$ indicates that the parking status of the target second training parking space is the vacant status, and $y_n'=1$ indicates that the parking status of the target second training parking space is the occupied status; $S_n'^0$ represents the second detection result for the target second training parking space in the $n^{th}$ one of the second training parking images, and indicates a probability of the vacant status calculated for the target second training parking space shown in said one of the second training parking images; and $S_n'^1$ represents the second detection result for the target second training parking space in the $n^{th}$ one of the second training parking images, and indicates a probability of the occupied status calculated for the target second training parking space shown in said one of the second training parking images, $S_n'^1 + S_n'^0 = 1$.

8. The method of claim 6, wherein a total number of the first training parking images equals that of the second training parking images, and, in step (L), the contrastive loss value is calculated according to:

$$L_1 = \frac{1}{2N}\sum_{n=1}^{N}(F_n)\cdot(D_n^{CF})^2 + (1-F_n)\cdot\{\max(0, \alpha_n - D_n^{CF})\}^2,$$

where $L_1$ represents the contrastive loss value; N represents the total number of the first training parking images; $F_n$ is an index that indicates whether the parking statuses of the first training parking spaces in an $n^{th}$ one of the first training parking images are identical to the parking statuses of the second training parking spaces in an $n^{th}$ one of the second training parking images, in which $F_n=0$ indicates that the parking statuses of the first training parking spaces in the $n^{th}$ one of the first training parking images are not identical to the parking statuses of the second training parking spaces in the $n^{th}$ one of the second training parking images, and $F_n=1$ indicates that the parking statuses of the first training parking spaces in the $n^{th}$ one of the first training parking images are identical to the parking statuses of the second training parking spaces in the $n^{th}$ one of the second training parking images; $\alpha_n$ is a predetermined constant; and $D_n^{CF}$ represents a contrastive feature distance, and is calculated according to:

$D_n^{CF} = \|G_{W_F}(G_{W_\theta}(X_n^l)) - G_{W_F}(G_{W_\theta}(X_n^r))\|_2$, where $G_{W_F}(G_{W_\theta}(X_n^l))$ represents the first parking status prediction result for the $n^{th}$ one of the first training parking images; $G_{W_F}(G_{W_\theta}(X_n^r))$ represents the second parking status prediction result for the $n^{th}$ one of the second training parking images; $G_{W_\theta}(\cdot)$ represents a spatial transforming equation defined by the set of candidate spatial transforming parameters; $G_{W_F}(\cdot)$ represents a feature extracting equation defined by the set of candidate feature extraction parameters; $X_n^l$ represents a set of the pixel values of the pixels of the $n^{th}$ one of the first training parking images; and $X_n^r$ represents a set of the pixel values of the pixels of the $n^{th}$ one of the second training parking images.

9. The method of claim 1, further comprising, before step (F):

Step (M): calculating a cross-entropy loss value by the computer system, based on the first parking status prediction results relating to the first training parking images, and the parking status of each of the first training parking spaces in each of the first training parking images;

wherein, in step (F), the computer system determines whether the combination of the set of candidate spatial transforming parameters, the set of candidate feature extraction parameters and the set of candidate logistic regression parameters is an optimal combination based on the first status classification loss value and the cross-entropy loss value.

10. The method of claim 9, wherein, in step (M), the cross-entropy loss value is calculated according to:

$$L_5 = -\frac{1}{2^M N}\sum_{n=1}^{N}\sum_{k=1}^{2^M}[h_n^k \log p_n^k + (1-h_n^k)\log(1-p_n^k)],$$

where $L_5$ represents the cross-entropy loss value; N represents a total number of the first training parking images; M represents a number of the first training parking spaces that have $2^M$ number of parking status combinations; $h_n^k$ is an index that indicates whether the parking statuses of the first training parking spaces in an $n^{th}$ one of the first training parking images are identical to the parking statuses of the first training parking spaces in a $k^{th}$ one of the parking status combinations, $1 \leq k \leq 2^M$, in which $h_n^k=0$ indicates that the parking statuses of the first training parking spaces in the $n^{th}$ one of the first training parking images are not identical to the parking statuses of the first training parking spaces in the $k^{th}$ one of the parking status combinations, and $h_n^k=1$ indicates that the parking statuses of the first training parking spaces in the $n^{th}$ one of the first training parking images are identical to the parking statuses of the first training parking spaces in the $k^{th}$ one of the parking status combinations; and $p_n^k$ indicates a probability of the $k^{th}$ one of the parking status combinations for the first training parking spaces shown in the $n^{th}$ one of the first training parking images, $P_n^1 + P_n^2 + \ldots + P_n^{2^M-1} + P_n^{2^M} = 1$.

11. A method of detecting parking spaces for a parking lot, comprising:

step (a): providing a computer system that stores a plurality of training parking images, wherein each of the training parking images shows therein a set of training parking spaces which are connected together, and each of which has a parking status that is one of an occupied status and a vacant status;

step (b): training, by the computer system, a parking space detection model based on the training parking images to acquire a set of spatial transforming parameters, a set of feature extraction parameters and a set of logistic regression parameters for the parking space detection model;

step (c): transforming, by the computer system, a target parking image, which shows a plurality of parking spaces including a target parking space, into a transformed target parking image based on the set of spatial transforming parameters;

step (d): performing, by the computer system, feature extraction on the transformed target parking image based on the set of feature extraction parameters to acquire a parking status prediction result relating to the parking spaces shown in the target parking image;

step (e): acquiring, by the computer system, a target parking space detection result for the target parking space based on the set of logistic regression parameters and the parking status prediction result; and step (f): notifying, by the computer system, a vehicle driver of the parking status of the target parking space based on the target parking space detection result.

12. The method of claim 11, wherein one of the training parking images is a target first training parking space, the computer system further storing the parking status of the target training parking space in each of the training parking images;

wherein step (b) includes:

sub-step (b-1): transforming, by the computer system, each of the training parking images into a corresponding transformed training parking image based on a set of candidate spatial transforming parameters;

sub-step (b-2): performing, by the computer system, feature extraction on each of the transformed training parking images, which respectively correspond to the training parking images, based on a set of candidate feature extraction parameters, so as to acquire a parking status prediction result relating to the training parking spaces shown in one of the training parking images that corresponds to the transformed training parking image;

sub-step (b-3): acquiring, for each of the transformed training parking images and by the computer system, a detection result for the target training parking space based on a set of candidate logistic regression parameters and the parking status prediction result that corresponds to the transformed training parking image;

sub-step (b-4): calculating, by the computer system, a status classification loss value based on the detection results that respectively correspond to the transformed training parking images and the parking status of the target training parking space in each of the training parking images;

sub-step (b-5): determining, by the computer system and based on at least the status classification loss value, whether a combination of the set of candidate spatial transforming parameters, the set of candidate feature extraction parameters and the set of candidate logistic regression parameters is an optimal combination; and sub-step (b-6): adjusting, by the computer system, the set of candidate spatial transforming parameters, the set of candidate feature extraction parameters and the set of candidate logistic regression parameters when it is determined in sub-step (b-5) that the combination of the set of candidate spatial transforming parameters, the set of candidate feature extraction parameters and the set of candidate logistic regression parameters is not an optimal combination, followed by repeating sub-steps (b-1) to (b-5) using the set of candidate spatial transforming parameters, the set of candidate feature extraction parameters and the set of candidate logistic regression parameters thus adjusted; and wherein, when it is determined in sub-step (b-5) that the combination of the set of candidate spatial transforming parameters, the set of candidate feature extraction parameters and the set of candidate logistic regression parameters is an optimal combination, the computer system performs steps (c) to (e) in which the set of candidate spatial transforming parameters, the set of candidate feature extraction parameters and the set of candidate logistic regression parameters of which the combination is determined by the computer system to be an optimal combination respectively serve as the set of spatial transforming parameters, the set of feature extraction parameters and the set of logistic regression parameters.

* * * * *